(12) United States Patent
Ackermann et al.

(10) Patent No.: US 10,427,485 B2
(45) Date of Patent: Oct. 1, 2019

(54) METHOD OF OPERATING A MOTOR VEHICLE, AND MOTOR VEHICLE

(71) Applicant: ZF Friedrichshafen AG, Friedrichshafen (DE)

(72) Inventors: Norbert Ackermann, Eitorf (DE); Helmut Baalmann, Bergrheinfeld (DE); Michael Triebel, Oberschwarzach (DE); Christian Maurischat, Euerbach (DE); Achim Thomae, Bergrheinfeld (DE); Andreas Förster, Schweinfurt (DE); Steffen Heyn, Niederwerrn (DE); Thomas Manger, Wasserlosen (DE); Stefen Rappelt, Sulzheim (DE); Sven Greger, Bergrheinfeld (DE); Sven Philip Krüger, Wuerzburg (DE); Jens Seiler, Kuernach (DE); Holger Kirchner, Ruppichteroth (DE); Hendrik Marquar, Schweinfurt (DE); Alexander Schwarz, Thuengen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 52 days.

(21) Appl. No.: 15/535,740

(22) PCT Filed: Nov. 18, 2015

(86) PCT No.: PCT/EP2015/076901
§ 371 (c)(1),
(2) Date: Jun. 14, 2017

(87) PCT Pub. No.: WO2016/096295
PCT Pub. Date: Jun. 23, 2016

(65) Prior Publication Data
US 2018/0037080 A1 Feb. 8, 2018

(30) Foreign Application Priority Data

Dec. 15, 2014 (DE) .......................... 10 2014 225 931

(51) Int. Cl.
*B60G 17/016* (2006.01)
*B60G 13/14* (2006.01)
(Continued)

(52) U.S. Cl.
CPC .......... *B60G 17/016* (2013.01); *B60G 13/14* (2013.01); *B60G 17/018* (2013.01);
(Continued)

(58) Field of Classification Search
CPC ...... B60G 17/016; B60G 13/14; B60G 15/10; B60G 17/018; B60G 17/0195;
(Continued)

(56) References Cited

U.S. PATENT DOCUMENTS 5,572,425 A * 11/1996 Levitt .................. B60G 17/018
280/5.504
6,908,162 B2 * 6/2005 Obayashi ................. B60L 7/26
303/152

(Continued)

FOREIGN PATENT DOCUMENTS

DE          3937986      5/1991
DE          10120102     10/2002
DE      102009022328    6/2010

*Primary Examiner* — Richard A Goldman
(74) *Attorney, Agent, or Firm* — Cozen O'Connor

(57) ABSTRACT

A method of operating a motor vehicle with a chassis system comprising at least two, preferably four vibration damper includes carrying out a body control and a wheel control with the chassis system, and controlling the energy supply for the chassis system via an energy control arrangement. A motor vehicle performing the method is also disclosed.

14 Claims, 3 Drawing Sheets

(51) Int. Cl.
*B60G 17/018* (2006.01)
*B60G 17/0195* (2006.01)
*B60W 10/22* (2006.01)
*B60W 10/24* (2006.01)
*B60W 20/13* (2016.01)

(52) U.S. Cl.
CPC ......... *B60G 17/0195* (2013.01); *B60W 10/22* (2013.01); *B60W 10/24* (2013.01); *B60W 20/13* (2016.01); *B60G 2300/50* (2013.01); *B60G 2400/61* (2013.01); *B60G 2500/10* (2013.01); *B60G 2600/02* (2013.01); *B60G 2800/85* (2013.01); *B60G 2800/912* (2013.01); *B60G 2800/916* (2013.01); *B60W 2510/242* (2013.01); *B60W 2520/00* (2013.01); *B60W 2710/226* (2013.01); *B60W 2710/24* (2013.01); *B60W 2720/00* (2013.01)

(58) Field of Classification Search
CPC ............ B60G 2300/50; B60G 2300/60; B60G 2400/61; B60G 2500/10; B60G 2600/02; B60G 2800/85; B60G 2800/912; B60G 2800/916; B60W 20/13; B60W 10/22; B60W 10/24; B60W 2510/242; B60W 2520/00; B60W 2710/226; B60W 2710/24; B60W 2720/00; B60W 2002/413
USPC .................... 280/5.5, 5.504; 701/37; 310/15
See application file for complete search history.

(56) References Cited

U.S. PATENT DOCUMENTS

| | | | | |
|---|---|---|---|---|
| 7,854,203 | B2* | 12/2010 | Kumar | B60L 9/16 |
| | | | | 105/35 |
| 9,174,508 | B2* | 11/2015 | Anderson | B60G 17/016 |
| 9,550,404 | B2* | 1/2017 | Giovanardi | F15B 13/0444 |
| 9,702,349 | B2* | 7/2017 | Anderson | B60G 17/019 |
| 9,868,332 | B2* | 1/2018 | Anderson | B60G 17/016 |
| 2002/0145404 | A1* | 10/2002 | Dasgupta | H02J 7/0013 |
| | | | | 320/116 |
| 2003/0034697 | A1* | 2/2003 | Goldner | B60G 17/0157 |
| | | | | 310/17 |
| 2009/0260935 | A1 | 10/2009 | Avadhany | |
| 2013/0147205 | A1 | 6/2013 | Tucker | |
| 2014/0265168 | A1* | 9/2014 | Giovanardi | F15B 13/0444 |
| | | | | 280/5.5 |
| 2015/0224845 | A1* | 8/2015 | Anderson | B60G 17/019 |
| | | | | 701/37 |

* cited by examiner

METHOD OF OPERATING A MOTOR VEHICLE, AND MOTOR VEHICLE

PRIORITY CLAIM

This is a U.S. national stage of application No. PCT/EP2015/076901, filed on 18 Nov. 2015. Priority is claimed on the following application: Country: Germany, Application No.: 10 2014 225 931.2, filed: 15 Dec. 2014, the content of which is/are incorporated herein by reference in its entirety.

FIELD OF THE INVENTION

The present invention is directed to a method of operating a motor vehicle with a chassis system comprising at least two, preferably four vibration dampers, wherein a body control and a wheel control are carried out with the chassis system.

BACKGROUND OF THE INVENTION

As is known, body control involves stabilizing or balancing the vehicle body, i.e., the body of the vehicle in the broadest sense, such that, for example, on inclined surfaces such as hillsides or on uneven terrain or when cornering, the effects on the body are reduced. This also includes, for example, rolling or pitching of the motor vehicle which must be controlled or reduced.

This function cannot be carried out by conventional vibration dampers. Both monotube dampers and twin-tube dampers are known, but are configured only for vibration damping.

Further, body control is to be distinguished from wheel control which comes into question when a vibration damper has an adjustable damping force. An adjustable damping force can be generated, for example, through an adjustable valve with which the flow resistance for the hydraulic medium in the vibration damper can be varied so that the damping force is also varied.

There are a number of different known systems by which body control can be carried out. For example, US 2009/0260935 A1 discloses a vibration damper which has a gerotor, i.e., a device which can be operated both as motor and as generator, which is coupled to a pump. This apparatus can be used to recuperate energy and to perform a body control and a wheel control. Accordingly, wheel control, body control and recuperation are achieved by the same apparatus. A vibration damper having the same operating principle is further disclosed in US 2013/0147205 A1 and US 2014/0265168 A1.

In contrast, DE 10 2009 022 328 A1 discloses a vibration damper in which the wheel control is carried out by a pressure regulating valve and the body control is carried out by a motor-pump unit. In this construction, the body control and the wheel control are implemented by independent units which can accordingly be optimized separately. A similar construction is shown in WO 2014/066469 A1. In this case, the adjustable damping forces are generated via adjustable valves, one for the rebound direction and one for the compression direction, and the body control is carried out via a motor-pump unit.

In order to utilize the vibration damper to compensate for road irregularities, it is known to use sensor data of cameras and, on this basis, to compensate the changing distance between vehicle body and road level such that road irregularities are not transmitted, or at least not transmitted in their entirety, to the vehicle body.

In the known chassis systems, there is the problem that they cannot simply be coupled to the energy power supply of the motor vehicle because the energy consumption and therefore the required energy supply is higher than that which can be made available by the vehicle power supply of the motor vehicle.

In view of the foregoing, it is an object of the present application to provide a method for operating a motor vehicle of the type mentioned above in which the chassis system can be operated via the vehicle power supply of the motor vehicle.

SUMMARY OF THE INVENTION

This object is met in that the energy supply for the chassis system is controlled via an energy control arrangement. This makes it possible to control the energy distribution and accordingly also allows a controlled operation of the chassis system in which the control takes place depending on the available or required energy. In this way, the chassis system can be connected to any power supplies, particularly to the vehicle power supply of a motor vehicle. The underlying idea consists not in optimizing the chassis system for a continuous availability, but in orienting the operation to the existing energy. In doing so, of course, the required energy and the available energy can be coordinated, and the energy control arrangement is provided for this purpose.

The energy consumption of the chassis system can advantageously be limited. This is the first step for coupling the chassis system to the vehicle power supply of the motor vehicle because the vehicle power supply cannot provide any amount of energy but only limited amounts.

Accordingly, a maximum value for a peak load and a maximum value for a continuous load can reasonably be predetermined. While the energy requirement of the chassis system fluctuates sharply over time, the available energy is dependent upon the vehicle power supply or system; in any case, it is limited. Further, however, it is desirable to provide maximum values below the output capacity of the vehicle power supply so that additional consumers can also be operated via the vehicle power supply without disruption. Therefore, specifying a maximum value for a peak load and for a continuous load allows an operation of the chassis system in which the other consumers attached to the vehicle power supply are not impaired.

Advantageously, a value between 400 W and 600 W, particularly 500 W, can be used as maximum value for the peak load. Further, a value between 100 W and 300 W, in particular 200 W, can be used as maximum value for the continuous load. These values for the peak load and the continuous load have turned out to be particularly advantageous for preventing an impairment of additional consumers. On the other hand, as will be described in detail later, it was also discovered that the chassis system makes do with these values in many operating states and, in the others, is led to a kind of "failsafe". The specified values are the optimal compromise between a greatest possible availability of all functions of the chassis system, i.e., body control and wheel control, while simultaneously limiting the available energy to values at which the additional consumers attached to the vehicle power supply are not affected.

Advantageously, the available amount of energy can be distributed when the energy requirement of the chassis system exceeds the available amount of energy or a maximum value. Accordingly, two variants are conceivable. For one, the energy control unit can ask how much energy the vehicle power supply can provide and how much is required by the chassis system and can pass on the corresponding amount of energy until the required amount of energy exceeds the available amount of energy. Alternatively, the distribution of the available amount of energy can always be carried out as soon as the available amount of energy exceeds the described maximum value with respect to the peak load or the continuous load. On the other hand, if the energy required by the chassis system is below the maximum value and less than the available amount of energy, there is no need for a distribution or division of energy. In this case, the required energy is available to the chassis system to a sufficient extent.

In this regard, it is assumed that the vehicle power supply can provide the energy or outputs predefined by the maximum values at any time. However, owing to the presence of the energy control arrangement, it is also possible that the vehicle power supply makes less energy available than the predefined maximum values during certain times. In this case, a prioritization must be carried out to decide whether the energy consumption specified by the chassis system is more important or whether the vehicle power supply must provide the energy for other systems.

In a particularly advantageous manner, the available amount of energy is made available first for the wheel control and then for the body control. This means that, in one configuration, the wheel control always has its entire energy requirement covered and the body control only obtains the surplus energy. This is based on the consideration that the wheel control predetermines the damping force of the vibration dampers and that this damping force should remain constant over the course of driving depending on the driver's command or on presets. In particular, a sudden change in the damping force may lead to an altered driving behavior of the motor vehicle, which can cause the driver to lose control of the vehicle under some circumstances. This is more critical than a loss of the body control through which a roll and pitch of the motor vehicle is to be compensated. When the body control is not working completely, the driver only suffers a loss of comfort.

On the other hand, it is also not the case that the functions of the wheel control completely fail when the energy requirement is not completely covered; rather, the valve which is used, by way of example only, to adjust the damping force can then not be energized to the maximum extent so that the adjusted damping force is limited to a value below the maximum value. Accordingly, it is provided alternatively that, on the average, of the available energy 5% to 15%, in particular 10%, is used for the wheel control and 85% to 95%, particularly 90%, is used for the body control. Since there is also not a total outage of the wheel control in this case, this variant is also acceptable. Further, it offers the advantage that the body control also never fails completely with this division, so that it is not absolutely necessary to provide a failsafe. Further, every failsafe mode can be realized economically because a failure of the body control will occur only in rare cases and need not be available for a standard application when energy amounts are too low in the vehicle power supply.

The body control and the wheel control can advantageously be carried out in the vibration dampers by different mechanisms. This is not the case in all of the known vibration dampers mentioned in the introduction. For example, in the vibration damper known from US 2009/0260935 A1 the wheel control and the body control are carried out simultaneously via the hydraulic pump. In this case, it is difficult to divide resources. Usually, when energy is tight the body control is always turned off and only wheel control is carried out. Therefore, the structural and functional separation of body control and wheel control is very advantageous when it is desirable to distribute or prioritize the available energy. The wheel control, i.e., the adjustment of damping force, can be carried out with all of the known mechanisms, for example, with proportional valves or rheological hydraulic medium.

The distribution or redistribution of the energy supply from the wheel control to the body control, or vice versa, can advantageously be accomplished continuously or quasi-continuously. A transition should be implemented particularly when there are sudden changes in the energy requirement of the chassis system. In this regard, it is preferable to change the proportion of allotted or available energy in small increments rather than to carry out an abrupt adaptation. This also applies to the wheel control. If for any reason whatsoever there should be no energy available to operate the wheel control, the vibration dampers have a minimum damping force. When sufficient energy is again available for adjusting the damping force as required, it should nevertheless not be increased to the required level in one step but rather in a plurality of steps. The driver can then adapt to the changed damping force and adjust his/her driving behavior to it and not be surprised by a sudden and abrupt change.

The distribution of the energy supply to the wheel control and the body control can advantageously be carried out depending on the storage condition of at least one energy storage. Preferably, the chassis system can draw its energy not only from the vehicle power supply but also from an energy storage, for example, a battery. This energy storage can be utilized to draw all of the required energy during sudden peak loads, and a portion, namely the amount of energy up to the maximum value, can be taken from the vehicle power supply, and the amount of energy required in excess of this can be taken from the energy storage. If the continuous consumption of the chassis system is greater than the amount of energy made available by the vehicle power supply as continuous output, energy is continuously removed from the energy storage and there is no possibility of replenishing the energy storage. The energy storage is then emptied at some point. However, when it is taken into account that the energy storage has been depleted, for example, to 20% of the maximum storage capacity, then with the amounts of energy remaining in the energy storage a continuous transition can be made to a distribution situation in which, for example, either the energy requirement of the wheel control is made available and the remainder is given to the body control or in which a percentagewise distribution is carried out. In every case, the transition to the predetermined control situation can take place continuously or quasi-continuously, and there is no abrupt discontinuation of the body control, for example. In this connection, the specified value of 20% is purely arbitrary. Any value can, of course, be utilized as threshold value. The threshold value is selected such that, proceeding from it, there is still sufficient energy to ensure the continuous transition into the control state.

The distribution of the energy supply to the wheel control and the body control can advantageously be carried out depending on at least one operating state of the motor vehicle. For example, it is possible that a collision detection system detects an imminent collision and can also identify the collision counterpart. In this case, it is possible that the energy available to the chassis system is guided in its entirety to the body control so that the front axle and/or the rear axle is raised or lowered as quickly as possible so as to minimize the damage arising from the collision. A wheel control, i.e., control of the damping force, is subordinated in this case.

In addition, the present invention is directed to a motor vehicle with a chassis system by which a body control and a wheel control can be carried out and to an energy control arrangement for controlling the energy supply to the body control and the wheel control. The motor vehicle is characterized in that the energy control arrangement is configured for implementation of the method according to one of the following claims. In particular, the wheel control and the body control can be implemented with the vibration dampers. The motor vehicle can be a passenger vehicle, a truck or a motorcycle.

To avoid repetition, the described method is referred to with respect to advantageous embodiments. In particular, the chassis system can have at least two, preferably four vibration dampers by which a body control and a wheel control can be carried out. Further, the motor vehicle can have an energy storage for at least a partial supply of energy to the chassis system. The chassis system is preferably connected to the vehicle power supply of the motor vehicle.

BRIEF DESCRIPTION OF THE DRAWINGS

Further advantages, features and details of the present invention are described with reference to the drawings in which.

DETAILED DESCRIPTION OF THE PRESENTLY PREFERRED EMBODIMENTS

Figure 1:
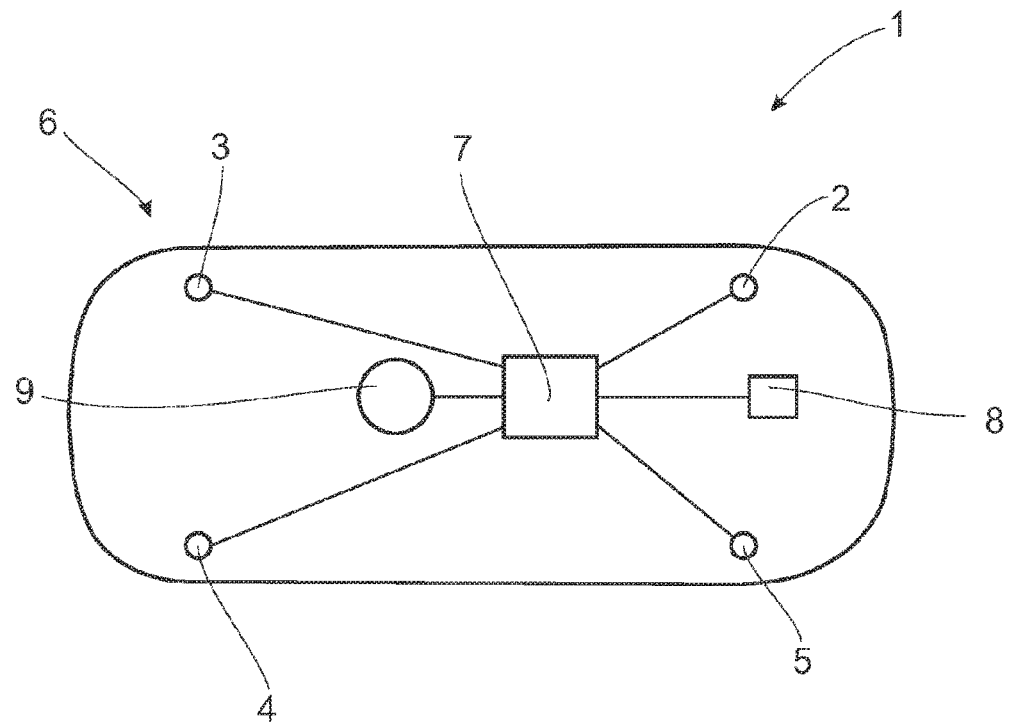
FIG. 1 is a schematic view of a motor vehicle including the present invention.

FIG. 1 shows a motor vehicle 1 with vibration dampers 2, 3, 4 and 5 which together form the chassis system 6. Further, the motor vehicle 1 has an energy control arrangement 7, an energy storage 8 and a vehicle power supply 9. The chassis system 6 in the form of vibration dampers 2, 3, 4 and 5 is connected to the vehicle power supply 9 via the energy control arrangement 7.

Alternatively, the vibration dampers 2, 3, 4 and 5 can also be connected directly to the vehicle power supply 9. In this case, however, the control of the energy distribution to the body control and wheel control functions realized in the vibration dampers 2, 3, 4 and 5, respectively, is to be implemented in a less economical manner.

A number of configurations of the energy allotment are shown in the following figures.

Figure 2:
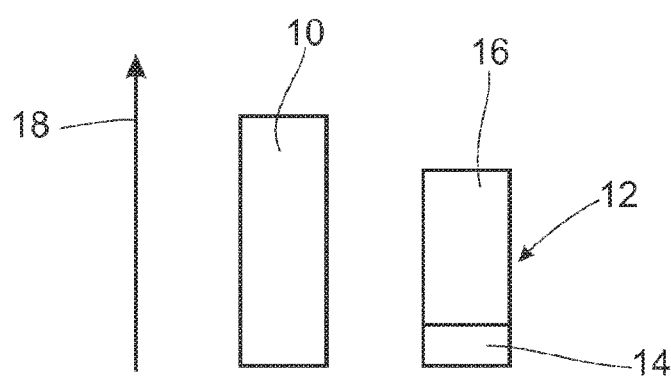
FIG. 2 depicts an energy amount and energy requirement in a first configuration.

FIG. 2 shows the simplest control case, namely when the vehicle power supply 9 makes available an energy amount 10 which is sufficient by itself to exceed the energy requirement 12 of the chassis system 6 which is composed of the energy requirement 14 for the wheel control and the energy requirement 16 for the body control. The energy amount is plotted in arbitrary units along axis 18. It is crucial that the energy amount 10 is higher than, and therefore greater than, the energy requirement 12. In this case, the energy control arrangement 7 can cover energy requirement 12 through energy amount 10 without the need for controlling intervention.

Figure 3:
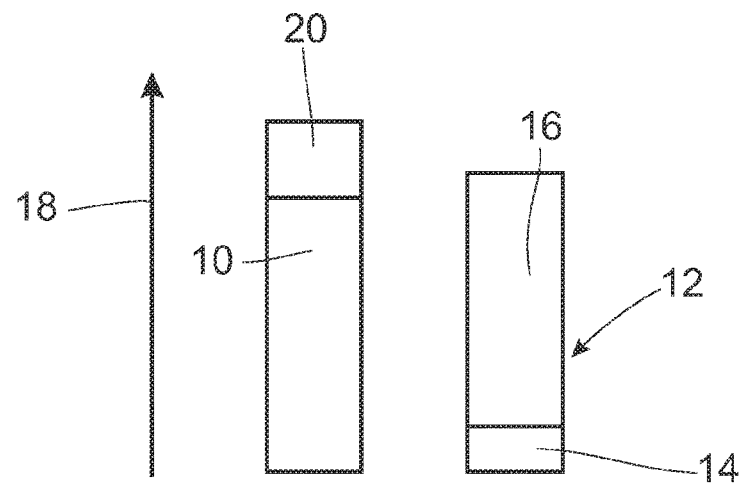
FIG. 3 depicts an energy amount and energy requirement in a second configuration.

FIG. 3 shows a further configuration in which a portion of the energy, namely energy amount 10, is retrieved from the vehicle power supply and an energy amount 20 is retrieved from the energy storage 8. In this case too, there is enough energy in total to satisfy the energy requirement 12 of the chassis system 6.

Figure 4:
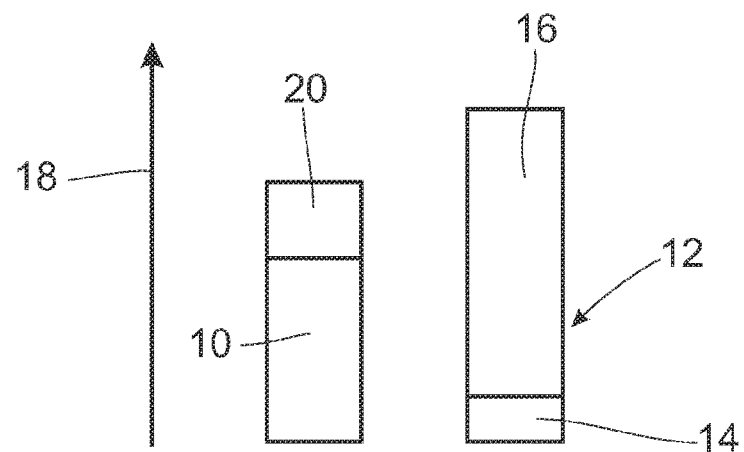
FIG. 4 depicts an energy amount and energy requirement in a third configuration.

However, there is a need for control when, as is shown in FIG. 4, the energy requirement 12 of the chassis system 6 exceeds the available energy amount 10 or 10 and 20. It will be noted that the control through the energy control arrangement 7 does not depend on the presence of an energy storage 8. In this case, the available energy amount 10 is predetermined solely through the vehicle power supply 9.

Figure 5:
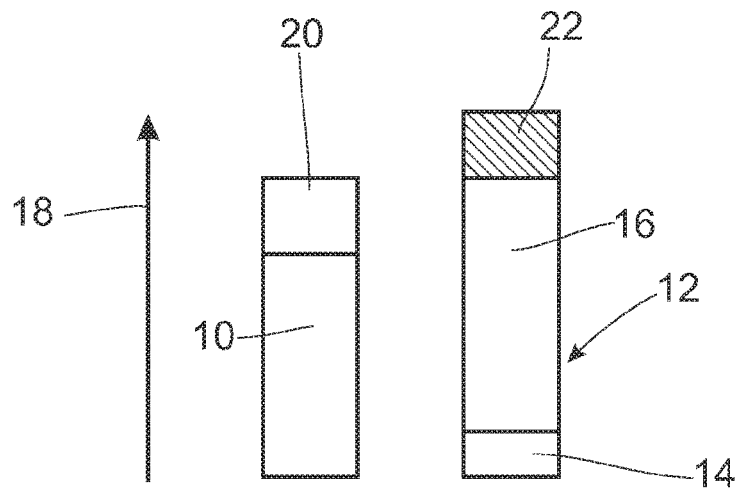
FIG. 5 depicts an energy amount and energy requirement in a fourth configuration.

FIG. 5 shows a first possibility for dividing the available energy amount. The energy requirement 14 for the wheel control is completely covered and the energy requirement 16 of the body control is covered to the extent that energy is available. Consequently, the energy requirement 22 for body control shown in the shaded portion is not met.

Figure 6:
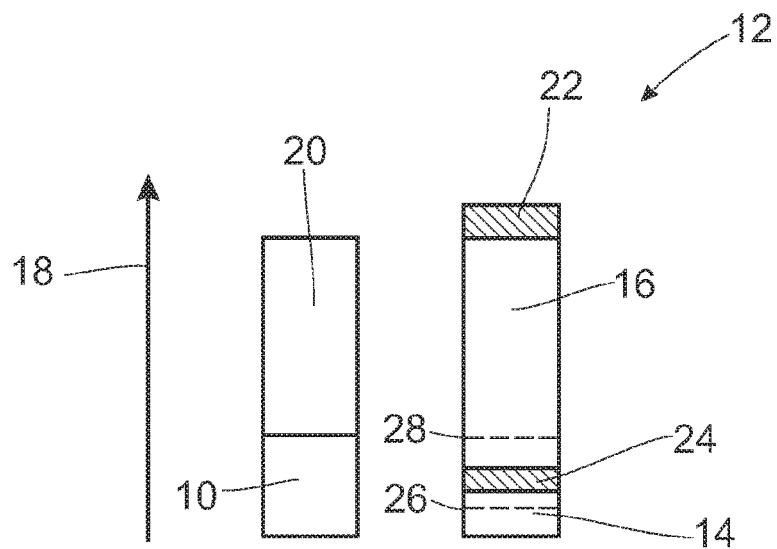
FIG. 6 depicts an energy amount and energy requirement in a fifth configuration.

Further, FIG. 6 shows a possible alternative to FIG. 5. In FIG. 6, the available energy amount 10 and 20 is divided percentagewise through the energy control arrangement 7. Consequently, the energy requirement 24 for the wheel control 14 and the energy requirement 22 for the body control 16 are not met. As a result of this, a roll or pitch cannot be completely compensated within the framework of the body control and the damping force actually strived for is not completely achieved within the framework of the wheel control. However, a certain percentage of roll and pitch compensation takes place and a certain percentage of damping force is also provided.

In the configuration shown in FIG. 6, it can be provided as additional decision mechanism in the energy control arrangement 7 that values do not fall below the threshold values 26 and/or 28 which are predefined either for the wheel control and/or for the body control. In particular, threshold value 26 can be necessary to ensure a minimum damping force.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method of operating a motor vehicle (1) with a chassis system (6) having at least two vibration dampers (2, 3, 4, 5), the method comprising the following steps:

carrying out a body control and a wheel control with the chassis system (6);

providing an energy control arrangement;

controlling the energy supply for the chassis system (6) with the energy control arrangement (7);

predetermining a maximum value for a peak load of the energy supply; predetermining a maximum value for a continuous load of the energy supply;

using a value between 400 W and 600 W as the maximum value for the peak load of the energy supply; and/or using a value between 100 W and 300 W as the maximum value for the continuous load of the energy supply.

2. The method according to claim 1, wherein the energy consumption of the chassis system is limited.

3. The method according to claim 1, comprising distributing the available energy amount (10, 20) when the energy requirement (12, 14, 16) of the chassis system (6) exceeds an available energy amount (10, 20) or a maximum value.

4. The method according to claim 1, comprising making available an available energy amount (10, 20) first for the wheel control and then for the body control.

5. The method according to claim 1, comprising using, on the average, of an available energy 5% to 15% for the wheel control and 95% to 85 % for the body control.

6. The method according to claim 1, comprising carrying out the body control and the wheel control in the vibration dampers by different mechanisms.

7. The method according to claim 1, comprising accomplishing a redistribution of the energy supply from the wheel control to the body control, or vice versa, continuously or quasi-continuously.

8. The method according to claim 1, comprising carrying out a distribution of the energy supply to the wheel control and the body control depending on a storage condition of at least one energy storage (8).

9. The method according to claim 1, comprising carrying out a distribution of the energy supply to the wheel control and the body control depending on at least one operating state of the motor vehicle (1).

10. The method according to claim 1, comprising carrying out the body control and the wheel control by the vibration dampers (2, 3, 4, 5).

11. A motor vehicle (1) comprising a chassis system (6) for carrying out a body control and a wheel control, and an energy control arrangement (7) for controlling the energy supply to the body control and the wheel control, and wherein the energy control arrangement (7) is configured for implementation of the method according to claim 1.

12. The method according to claim 1, comprising using a value of 500 W as a maximum value for the peak load.

13. The method according to claim 1, comprising using a value of 200 W as a maximum value for the continuous load.

14. The method according to claim 1, comprising using, on the average, of the available energy 10% for the wheel control and 90% for the body control.

* * * * *